(12) United States Patent
Wieckhorst et al.

(10) Patent No.: US 12,239,037 B2
(45) Date of Patent: Mar. 4, 2025

(54) SYSTEM AND METHOD FOR COLLECTING AGRICULTURAL MEASURED DATA IN AN AGRICULTURAL PRODUCTION MACHINE

(71) Applicant: CLAAS Tractor SAS, Vélizy-Villacoublay (FR)

(72) Inventors: Jan Carsten Wieckhorst, Uelzen Ortsteil Hanstedt (DE); Christian Ehlert, Bielefeld (DE); Christian Birkmann, Versmold (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 230 days.

(21) Appl. No.: 17/880,917

(22) Filed: Aug. 4, 2022

(65) Prior Publication Data
US 2023/0048528 A1 Feb. 16, 2023

(30) Foreign Application Priority Data
Aug. 10, 2021 (DE) .......................... 102021120757.6

(51) Int. Cl.
*A01B 79/00* (2006.01)
*A01B 63/111* (2006.01)
*A01B 71/02* (2006.01)

(52) U.S. Cl.
CPC ........ *A01B 79/005* (2013.01); *A01B 63/1112* (2013.01); *A01B 71/02* (2013.01)

(58) Field of Classification Search
None
See application file for complete search history.

(56) References Cited

U.S. PATENT DOCUMENTS

| 6,076,611 A * | 6/2000 | Rozendaal ............. A01B 63/32 172/474 |
| 10,085,372 B2 | 10/2018 | Noyer |
| 10,462,957 B2 | 11/2019 | Clement et al. |
| 2013/0116896 A1 | 5/2013 | Blank |

(Continued)

FOREIGN PATENT DOCUMENTS

| DE | 102010031344 A1 | 1/2012 | |
| EP | 3871481 A1 * | 9/2021 | ............. A01B 63/00 |

OTHER PUBLICATIONS

European Search Report for European patent application No. 22168285.9-1105 mailed Oct. 13, 2022.

(Continued)

*Primary Examiner* — Justin S Lee
(74) *Attorney, Agent, or Firm* — Lempia Summerfield Katz LLC (57) ABSTRACT

A method and system for collecting agricultural measured data in an agricultural production machine that is combined with at least one agricultural attachment for fieldwork is disclosed. A sensor assembly is provided that has a sensor and a control assembly. The sensor may be integrated in combinations comprising (or consisting of) an agricultural production machine and a plurality of agricultural attachments. The sensor records measured data relating to at least one work quality parameter of the particular attachment and transmits it to the control assembly. In turn, the control assembly generates a common data set in a standardization routine from the measured data relating to the different attachments.

19 Claims, 2 Drawing Sheets

(56) References Cited

U.S. PATENT DOCUMENTS

| | | | |
|---|---|---|---|
| 2016/0071223 A1 | 3/2016 | Rupp et al. | |
| 2017/0315555 A1 | 11/2017 | Sugumaran et al. | |
| 2017/0325394 A1 | 11/2017 | Clement et al. | |
| 2017/0325395 A1 | 11/2017 | Noyer et al. | |
| 2018/0120133 A1 | 5/2018 | Blank et al. | |
| 2019/0392719 A1* | 12/2019 | Parker | G08G 5/0086 |
| 2021/0337734 A1* | 11/2021 | Jeanty | B25J 9/0087 |

OTHER PUBLICATIONS

Claims for European Application No. 22 168 285.9-1105 as Filed on Apr. 14, 2024.
Intention to Grant for European Application No. 22 168 285.9-1105 mailed on May 17, 2024.
Claims with Intention to Grant (Amended) for European Application No. 22 168 285.9-1105 filed on May 17, 2024.
Claims with Intention to Grant (Marked-up Copy) for European Application No. 22 168 285.9-1105 filed on May 17, 2024.
Request for Correction Amendment for European Application No. 22 168 285.9-1105 mailed on Aug. 2, 2024.
Claims for European Application No. 22 168 285.9-1105 filed by applicant on Aug. 2, 2024.

* cited by examiner

SYSTEM AND METHOD FOR COLLECTING AGRICULTURAL MEASURED DATA IN AN AGRICULTURAL PRODUCTION MACHINE

CROSS REFERENCE TO RELATED APPLICATION

This application claims priority under 35 U.S.C. § 119 to German Patent Application No. DE 102021120757.6 filed Aug. 10, 2021, the entire disclosure of which is hereby incorporated by reference herein. This application is further related to: U.S. Utility Application Ser. No. 17/880,913; U.S. Utility Application Ser. No. 17/880,909; U.S. Utility application Ser. No. 17/880,906; U.S. Utility Application Ser. No. 17/880,904; U.S. Utility application Ser. No. 17/880,900, each of which are incorporated by reference herein in their entirety.

TECHNICAL FIELD

The invention relates to a method for collecting agricultural measured data in an agricultural production machine and a system for collecting the agricultural measured data (such as a sensor assembly).

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

U.S. Pat. No. 10,085,372 B2, U.S. Pat. No. 10,462,957 B2, US Patent Application Publication No. 2017/0325394 A1, and US Patent Application Publication No. 2017/0325395 A1, each of which are incorporated by reference herein in their entirety, relate to collecting agricultural measured data.

Agricultural production machines, such as tractors, may be combined with various attachments. These attachments may be attached by an equipment interface to the agricultural production machine. Thus, one focus is on agricultural combinations with an agricultural production machine and an agricultural attachment, wherein the agricultural attachment may be an independent vehicle. Further, the agricultural attachment may be pulled by the agricultural production machine.

Such attachments generally serve to perform an agricultural job, such as on fieldwork. The fieldwork may, for example, be sowing or fertilization processes, the application of pesticides, working the soil like plowing, or harvesting processes like mowing. Common to these types of fieldwork is that the attachments are generally adjusted to a specific working height. The working height may, for example, also assume a negative value, for example in case of plowing, and may therefore be a working depth. The success, and to an extent the energy consumption of the fieldwork, frequently depends largely on the working height. At the same time, it depends on various machine parameters of the attachment of an agricultural production machine, however.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed in the background, when plowing, the working height may depend, on the one hand, on parameters that are manually adjusted on the plow by the user depending on the plow, and on the other hand on settings of the equipment interface on the agricultural production machine. Moreover, an axial load and tire pressure of the agricultural production machine may have an indirect influence on the working depth of the plow via the tire suspension. The working depth of modern plows may, in principle, be adjusted somewhat by hydraulic cylinders, however, the needed measured data to specifically make the settings may be absent (e.g., the underlying data to determine whether to make the adjustment may be absent). There may be similar problems with other agricultural attachments.

Frequently, a working height is therefore set in practice for fieldwork and is kept constant while performing the fieldwork. This constancy may, however, also be based on regulations that may sometimes be very complex and sometimes also be imprecise. Machine parameters of the agricultural production machine, such as the tire pressure, are typically not taken into account. Only a relative working height measurement is therefore used.

If at all, work quality parameters are typically recorded by the combination at a decentralized location on the attachment. They are used there for regulation while the job is being performed. However, there is generally no exploitation or use of work quality parameters from previous jobs. In addition, the agricultural production machine may be used with various attachments over the year. In this regard, it may be a challenge to improve the known state-of-the-art.

Thus, in one or some embodiments, a method and system are disclosed that improves the acquisition of measured data over the year. In one or some embodiments, a method for collecting agricultural measured data in an agricultural production machine that is combined or works in combination with at least one agricultural attachment for performing fieldwork is disclosed. A sensor assembly is provided that includes a sensor and a control assembly. In particular, the sensor in the sensor assembly may be integrated in a plurality of combinations comprising (or consisting of) an agricultural production machine and agricultural attachments. This integration enables combining and synergistically using the data collected over a predetermined period of time (such as over a year). In particular, the sensor may be integrated in combinations comprising (or consisting of) an agricultural production machine and a plurality of agricultural attachments, that the sensor records (e.g., senses or generates) measured data relating to at least one work quality parameter of the particular attachment and transmits it to the control assembly, and that the control assembly generates a common data set in a standardization routine from the measured data relating to the different attachments.

With regard to attachment-specific data processing, one or both of the measured data may be determined or may be processed specific to the attachment. In one way or the other, a common database may be generated therefrom that comprises the at least one work quality parameter for the various work processes. Accordingly, measured data from different attachments and work processes may be converted into the common data set and may be monitored and used over a long predetermined time, such as a season (e.g., a harvesting season).

In one or some embodiments, the data set may be integrated into the agricultural combination by a bus connection of the sensor. The bus may comprise an ISO bus or a CAN bus. In addition or alternatively, the sensor may be installed by the manufacturer in the agricultural production machine, and may be integrated in a machine communication bus of the agricultural production machine. Specifically, the sensor may be installed by the manufacturer (such as permanently installed) in the agricultural production machine, and may be integrated in the machine communication bus of the agricultural production machine. In one or some embodiments, the sensor is installed under the tractor.

In one or some embodiments, the sensor is a working height sensor. The working height is an example of the work quality parameter for various different attachments. At the same time, this work quality parameter may be easily measured by the same sensor for different attachments. In particular in soil-working processes, the working height, or respectively the working depth, is one of the central work quality parameters that may have a major influence on the following jobs. Measuring the working height simultaneously also may make it possible to effectively regulate the working height. In particular, the control assembly may regulate the working height based on the measured data.

In one or some embodiments, a modular sensor system may be suitable for use as the working height sensor, which may be mounted on different attachments using a sensor holder. The sensor holder may remain on the attachment for this, and only the sensor is mounted on the particular attachment for the job. Specifically, the sensor may be reversibly mounted (e.g., always reversibly mounted) using the at least one sensor holder at a mounting position on different attachments. In one or some embodiments, the sensor holder is mounted separately from the sensor on the different attachments. The sensor may be reversibly mounted on the sensor holder. In the mounted state, the sensor may record measured data relating to a working height of the attachment and transmit the measured data to the control assembly. The control assembly may determine the working height of the particular attachment from a mounting-position-specific calibration data set. In this regard, this modular sensor system makes it possible to economically measure the working height of a plurality of agricultural attachments using one or a few sensors.

In one or some embodiments, different sensors are contemplated including any one, any combination, or all of: a distance sensor; an optical sensor; a radar sensor; a lidar sensor; an ultrasound sensor; or an NIR sensor. The sensor may measure the measured data relating to work quality parameters while the fieldwork is being performed and/or after the fieldwork has been performed. Another sensor may measure the measured data relating to work quality parameters while the fieldwork is being performed and/or after the fieldwork has been performed. In one or some embodiments, the control assembly determines the work quality parameter from the measured data of the sensor and the another sensor. In one or some embodiments, the sensor(s) may be suitable in the agricultural sector, particularly to measure the working height. In addition, another sensor may be provided that measures the forefield. In particular, a change of the field may therefore be determined as a work quality parameter.

In one or some embodiments, the one or more work quality parameters may be measured with a lidar sensor. Specifically, the sensor may comprise the lidar sensor, with the work quality parameter comprising crumbling and/or leveling of seed bed preparation, and/or forefield furrow width, and/or a plowing pattern when plowing, and/or leveling by grubbers, and/or the result of fieldwork by leveling bars and/or an edge plate of a rotary harrow.

In one or some embodiments, the one or more work quality parameters may be measured with a 3D camera. Specifically, the sensor may comprise a 3D camera, with the work quality parameter(s) comprising mixing by grubbers, and/or a side pull of a plow) or the disc harrow, and/or accuracy of a parallel run, such as when driving on slopes.

In one or some embodiments, the control assembly controls or regulates at least one machine parameter of the agricultural production machine and/or the particular attachment based on the measured data during a job. Further, in one or some embodiments, the control assembly does not do this during another job. More specifically, the sensor may record measured data during the another job even though an attachment is not used. Further, the control assembly may generate the common data set therefrom and from further measured data. More specifically, the sensor may record measured data while performing the another job in which no attachment is used, and the control assembly generates the common data set therefrom and from other measured data. This may show how measured data may be collected over the course of a season, which may enable a more holistic view of the field.

In one or some embodiments, work quality parameters may relate to a working depth, and/or the at least one work quality parameter relates to soil humidity, and/or re-hardening, and/or a mixing of the soil, and/or plant residue, and/or a soil composition. These may make it possible to analyze the field quality particularly well and correspondingly plan additional jobs. In one or some embodiments, the control assembly may plan the execution of a job based on the common data set, with the planned job being soil cultivation (e.g., plowing), and/or a fertilizing process, and/or a spraying process, and/or a watering process, and/or a crop management process. In this way, the system provides the ability to plan another job based on the common data set. In one or some embodiments, the control assembly may control or regulate at least one machine parameter of the agricultural production machine, and/or the attachment, such as a working height of the attachment, based on the planned job, and/or based on the measured data relating to the work quality parameter. In this way, the control assembly may control or regulate the machine parameter based on the planned job.

In one or some embodiments, the operations may be location based. In particular, the control assembly link the measured data to a position in the standardization routine, and/or the control assembly may be arranged, at least partially (or completely) in the agricultural production machine. The control assembly may link position data of a position sensor, such as a GPS sensor, of the agricultural production machine to the measured data in the standardization routine. This may enable efficient, position-dependent saving and use of the measured data. Among other things, this may take the circumstance into account that an individual field is also not at all homogeneous. Hollows, wet areas, changes in the type of soil and the state of the soil, changes in vegetation, etc. may therefore be taken into account.

In one or some embodiments, a sensor assembly configured for use in the disclosed method is also disclosed. As such, any reference to the method is equally applicable to the sensor assembly.

Referring to the figures, the disclosed solution may be applied to a wide range of agricultural production machines 1, such as self-propelled agricultural production machines 1. This may include tractors. In the embodiment that as shown, the agricultural production machine 1 is a tractor.

The agricultural production machine 1 may be combined via at least one equipment interface 2 with at least one agricultural attachment 3. The equipment interface 2 in this case may generally comprise a mechanical coupling between the agricultural production machine 1 and the agricultural attachment 3. In the shown exemplary embodiment, the equipment interface 2 is designed as a three point power lifter 4 that has two lower links 5 and one upper link 6 for coupling to the agricultural attachment 3. The equipment interface 2 may be designed as a front or rear power lifter. In principle, the equipment interface 2 may also be a ball hitch. Other versions of the equipment interface 2 are systems with a simple drawbar coupling, with hitch hooks, with a ball head coupling, or the like.

Figure 1:
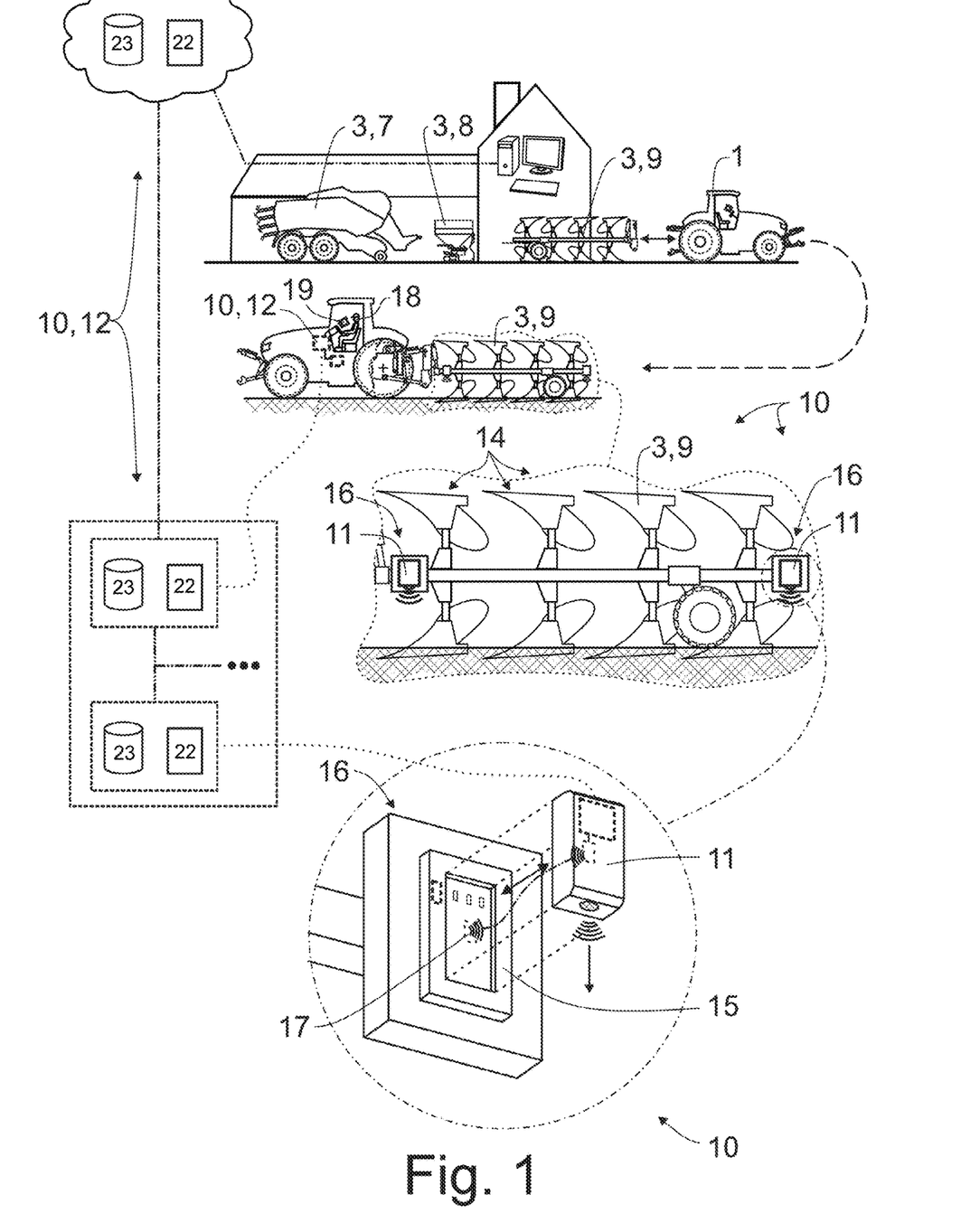
FIG. 1 illustrates an agricultural fleet with the proposed sensor assembly while the proposed method is being performed.

FIG. 1 shows several agricultural attachments 3 that may be used in the disclosed method, such as a baler 7, an artificial fertilizer spreader 8, and a plow 9. These are shown in action in FIGS. 2A-D.

In one or some embodiments, at least some of the agricultural attachments 3 are independent vehicles with at least one independent axle and independent wheels. In addition or alternatively, the agricultural attachment 3 may be designed without an axle or wheels and may be borne by the tractor or another agricultural attachment 3. In this regard, reference is made to the equipment interfaces 2 previously mentioned.

The embodiment shown in the figures relates to a method for collecting agricultural measured data in an agricultural production machine 1 that is combined with at least one agricultural attachment 3 for fieldwork, wherein a sensor assembly 10 is provided that has a sensor 11 and a control assembly 12.

The sensor assembly 10 as such may be integrated independently at least partially in the agricultural production machine 1. In particular, the control assembly 12 of the sensor assembly 10 may, for example, be a control assembly 12 of the agricultural production machine 1. Likewise, this may, however, also comprise (or consist of) distributed computing units. The control assembly 12 may, for example, have a control unit of the agricultural production machine 1 and a cloud control unit.

The various assemblies, such as sensor assembly 10 and/or control assembly 12 may comprise any type of computing functionality, such as at least one processor 22 (which may comprise a microprocessor, controller, PLA, or the like) and at least one memory 23. This is illustrated, for example, in FIG. 1, with the computing functionality equally applied to each of FIGS. 2A-D. The memory 23 may comprise any type of storage device (e.g., any type of memory). Though the processor 22 and memory 23 are depicted as separate elements, they may be part of a single machine, which includes a microprocessor (or other type of controller) and a memory. Alternatively, processor 22 may rely on memory 23 for all of its memory needs.

The processor 22 and memory 23 are merely one example of a controller assembly configuration. Other types of controller assembly configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the sensor 11 may be integrated in combinations comprising (or consisting of) an agricultural production machine 1 and a plurality of agricultural attachments 3, that the sensor 11 records measured data relating to at least one work quality parameter of the particular agricultural attachment 3 and transmits it to the control assembly 12, and that the control assembly 12 generates a common data set in a standardization routine from the measured data relating to the different agricultural attachments 3.

The measured data are transmitted by the sensor 11 to the control assembly 12. The measured data may be transmitted by the sensor 11 to the control assembly 12 in any manner whatsoever. In particular, the sensor 11 does not have to actively send the data; it may also be read out. In one or some embodiments, the transmission is regular (e.g., at predetermined intervals) and/or continuous.

The sensor 11 may be integrated in the agricultural combination comprising (or consisting of) the agricultural production machine 1 and the agricultural attachment 3. In one or some embodiments, the sensor 11 may be integrated in a plurality of agricultural combinations with different agricultural attachments 3. On the one hand, this may be achieved by full integration in the agricultural production machine 1 and on the other hand by a modular sensor system 11 that may be used with different agricultural attachments 3. The work quality parameter may be determined from the measured data and, in this case, refers to one or more aspects of the field, such as to the ground and or the crop.

In one or some embodiments, various work quality parameters may be added by the standardization routine from entirely different jobs to a ground memory or field memory as a common data set. For example, a working depth of a plowing process may be combined with a work quality parameter of subsequent sowing, the work quality parameter of various fertilization and plant protection measures, and a work quality parameter of a harvesting process. This sequence may be adapted in a plan by work quality parameters from last season or jobs in order to collect and use an ever increasing amount of information about the field over time.

In one or some embodiments, the integrated sensor 11 collects data, such as during each job, that may be combined with each other. This may go so far that the sensor 11 itself collects data that is actually unnecessary for the present job. Since the sensor 11 may still be available, this measured data may also be collected and used. At the same time, the measured data may be used on site while performing the job to control or regulate the agricultural combination. This dual use of the sensor 11 is particularly cost-efficient.

In one or some embodiments, the standardization routine combines the measured data into a common data set.

Depending on the type of sensor 11 and the type of measured data, the standardization routine may be complex or relatively simple. In one embodiment, the measurement by the sensor 11 itself does not differ, or only differs slightly, between the agricultural attachments 3 so that it is correspondingly easy to combine the measured data.

In one or some embodiments, the control assembly 12 determines the work quality parameter of the particular agricultural attachment 3 from the measured data using the attachment-specific calibration data set, and/or the control assembly 12 converts the measured data by an attachment-specific standardization data set into standardized data, such as attachment-independent measured data, and combines it into the common data set. It is also contemplated for the control assembly 12 to generate a common data set from the standardized measured data that comprises the work quality parameter for different processed jobs of the agricultural production machine 1 with different agricultural attachments 3.

An example of the compilation may be explained with reference to flatness. When plowing a winter furrow, the surface should be as a jagged as possible. This flatness may then be converted into a standardized data set and saved with the information that a winter furrow has been plowed. When preparing to sow, the surface should contrastingly be flat. For this, a different agricultural attachment 3 may be used. This flatness may also be saved. This may then be used for a statistical evaluation of the different types of soil tillage.

The attachment-specific calibration data set may, for example, comprise a position of the sensor 11, for example of the modular sensor system 11 yet to be explained, and/or the type of agricultural attachment 3, and/or its effects on the soil and the like. In one or some embodiments, the calibration data set relates to the data that are needed to generally ascertain the work quality parameter from the measured data.

In one or some embodiments, the attachment-specific standardization data set relates to the data that are needed to generate the common data set from the measured data and/or the work quality parameter. This may, for example, be any one, any combination, or all of GPS data, timestamps, or various data on the agricultural attachment 3. In one or some embodiments, the timestamp by itself may fail to constitute standardization. Instead, some type of conversion of the data may be needed. In one or some embodiments, in particular measured data of agricultural attachments 3 of the same type, but for example from different manufacturers or series, may be transferred to the common data set in such a manner that their layout does not significantly vary. The work quality parameter may be situated on a deeper level and for example be a working depth, but it may also depict a more abstract quality, such as any one, any combination, or all of: overall quality (e.g., soil quality); field quality; or crop quality.

In one or some embodiments, the sensor 11 is connected to a bus, such as an ISO bus or CAN bus, of the agricultural production machine 1, and/or the sensor 11 is installed by the manufacturer (e.g., permanently installed) or with a proprietary interface in the agricultural production machine 1, and may integrated in a machine communication bus of the agricultural production machine 1, and the sensor 11 may be installed under the tractor. With optical methods, frequently a high sensor position may be preferred given the strong generation of dust.

Figure 2A:
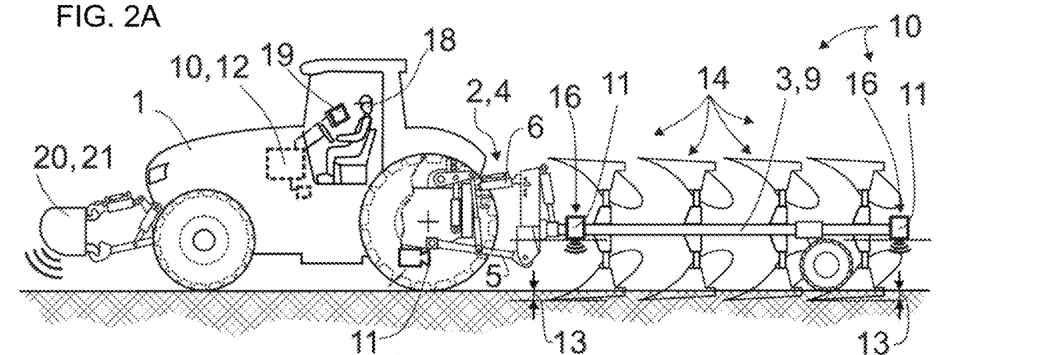
FIGS. 2A-D illustrate different attachments with which the disclosed method may be performed.
Figure 2B:
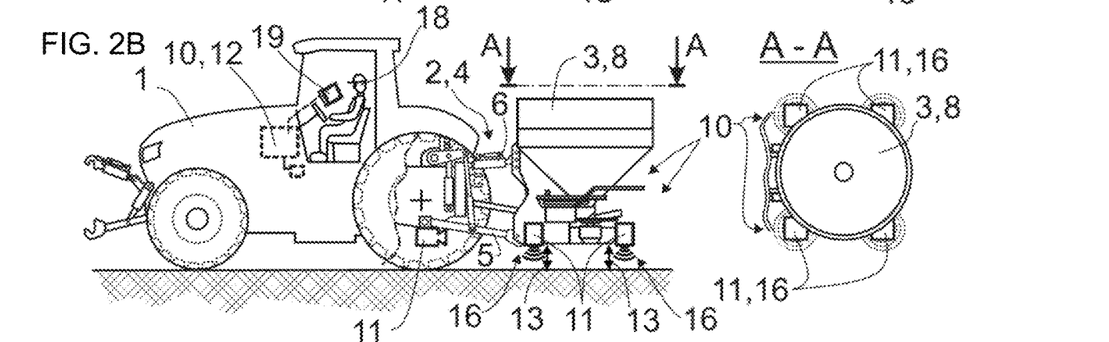
Figure 2C:
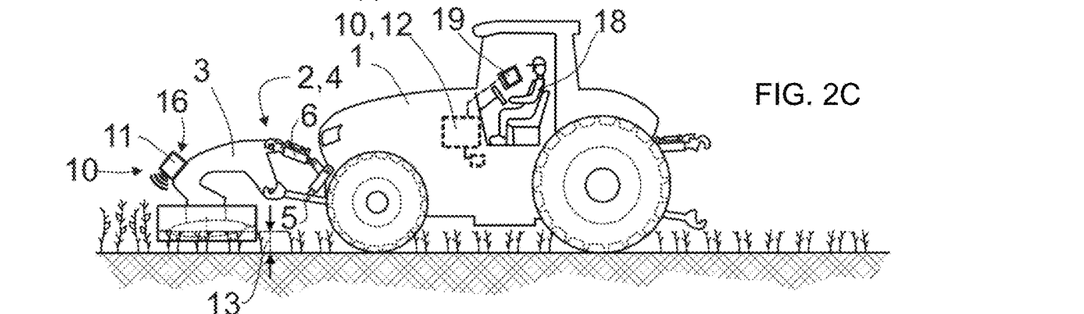
Figure 2D:
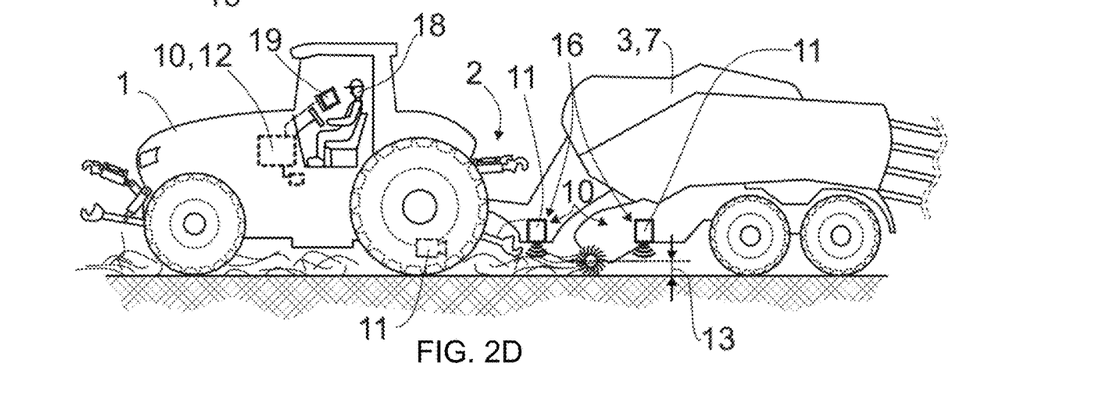

An example of a sensor 11 permanently installed in the tractor is shown in FIGS. 2A, 2B, and 2D. If the sensor 11 is permanently installed, this may have the particular advantage that it may also be fastened to poorly accessible locations since exchangability in the sense of the modular sensor system 11 (yet to be explained) no longer has to be taken into consideration. This may also lead to the fact that the sensor 11 may basically be used continuously, and the common data set is correspondingly complete. Moreover, the positioning of the sensor 11 may be adapted as needed to dust generation, for example, again without taking into consideration the accessibility of the sensor 11.

Moreover, in one or some embodiments, the sensor 11 is a working height sensor. Further, the work quality parameter may comprise an absolute working height 13 (e.g., an absolute working depth). In addition, in one or some embodiments, the control assembly 12 regulates the working height 13 based on the measured data. Alternatively, the sensor 11, as will be explained below, may be an optical sensor, for example, such as a lidar sensor, in order to detect the flatness of the soil, or a 3D camera, in order to detect the mixture of organic materials.

The term "absolute" is not necessarily to be understood as a precise measurement, but generally as a measurement relative to the soil. It is basically contemplated for the measurement to be relative to a component whose height relative to the soil is known. In one or some embodiments, however, the absolute working height 13 may be measured directly relative to the soil. It may also be a working depth if the agricultural attachment 3 enters into the soil. In principle, the working height 13 relates to a component of the agricultural attachment 3 that serves to work the field. This fieldwork may however also be sowing or the like. For example, the absolute working height 13 relates to the distance of a plowshare 14 to the soil, in this case generally the working depth, the distance of a discharge of a manure spreader or sprayer to the soil, or the like. In one embodiment, the focus is on the soil cultivation equipment, which is why the working height 13 may comprise a working depth.

In one or some embodiments, the sensor 11 is always reversibly mounted using the at least one sensor holder 15 at a mounting position 16 on different agricultural attachments 3. In one or some embodiments, the sensor holder 15 may be mounted separately from the sensor 11 on the different agricultural attachments 3. Further, in one or some embodiments, the sensor 11 may be reversibly mounted on the sensor holder 15, in the mounted state, the sensor 11 records measured data relating to a working height 13 of the agricultural attachment 3 and transmits it to the control assembly 12, and the control assembly 12 determines the working height 13 of the particular agricultural attachment 3 from a mounting-position-specific calibration data set.

The mounting-position-specific calibration data set, as explained below, may be saved in any desired memory, created new, or provided to the control assembly 12 in a different way.

One advantageous use of the modular sensor system 11 relates to the measurement of the working height 13 of an agricultural attachment 3 that does not have its own electronics. As will be seen below, the sensor assembly 10 may therefore be independent from the agricultural attachment 3. Alternatively, the sensor 11 does not communicate with the agricultural attachment 3. Still alternatively, the sensor 11 is integrated in electronics of the agricultural attachment 3 or communicates therewith. Also in the case of agricultural attachments 3 with electronics, it may however be provided that the sensor 11 does not communicate directly with the agricultural attachment 3. In one or some embodiments, the sensor assembly 10 may be used with agricultural attachments 3 with and without electronics. Alternatively, it may even be provided that the determination of the working height 13, apart from the calibration itself, is completely independent of the agricultural attachment 3.

In one or some embodiments, the situation is such that the mounting-position-specific calibration data sets comprise a reference height, and/or an orientation of the sensor 11 in the mounted state at the particular mounting position 16, and/or a location of the mounting position 16 relative to the agricultural attachment 3.

The reference height may originate from a calibration routine yet to be explained, and relates to a height of the mounting position 16 of the sensor 11 in a reference state, preferably with a known working height 13. The orientation of the sensor 11 may, for example, be a tilt of the sensor 11. This may take into account that the sensor 11 might not measure the shortest distance to the ground. The location of the mounting position 16 relative to the agricultural attachment 3 may be selected from a group of given mounting positions 16 or may be determined in another way. FIG. 1 for example shows two mounting positions 16 on a plow 9. FIGS. 2A-D also show several possible mounting positions 16 on different agricultural attachments 3. As will be explained, it is also possible to measure several working heights 13 per agricultural attachment 3 and thereby record, for example, an angle of the agricultural attachment 3. To accomplish this, it may be necessary to locate the mounting position 16 of one or more sensors 11.

In one or some embodiments, the mounting-position-specific calibration data sets are saved in a memory of the control assembly 12. In this case, this memory may comprise a local memory of the agricultural production machine 1. In principle, a cloud memory or the like is also contemplated. Calibration data sets relating to mounting positions 16 of at least two, or of at least three, different types of agricultural attachments 3 may be saved in the memory.

In one or some embodiments, the agricultural attachments 3 comprise types of agricultural attachments 3 for which the control assembly 12 determines a working height 13. The different types of agricultural attachments 3 may comprise at least one type of soil cultivation device, such as at least two types of soil cultivation devices.

The types of soil cultivation devices may comprise any one, any combination, or all of: a plow 9; a cultivator; or a harrow.

The different types of agricultural attachments 3 may comprise an artificial fertilizer spreader 8 and/or a seeder, such as a sowing coulter, and/or a mower, and/or a pickup, and/or an agricultural attachment 3 with a pickup, such as a baler 7 or a loader wagon.

As shown in the lower region of FIG. 1, the sensor holder 15 may be mounted separately from the sensor 11 on the different agricultural attachments 3. The sensor 11 may then reversibly mountable on the sensor holder 15. It may be provided in principle that the sensor holder 15 is a relatively inexpensive mass-produced component, while the sensor 11 itself is relatively expensive. The disclosed method allows the expensive sensor 11 to be reused.

For reasons of convenience, however, it may be provided that the sensor holder 15 remains on the agricultural attachment 3. On the one hand, this has clear advantages in the context of the calibration routine yet be explained, but on the other hand it also enables the sensor holder 15 to be mounted in a stable and more involved manner, while the mounting of the sensor 11 on the sensor holder 15 itself may be relatively simple. This also allows the same mounting position 16 to be reused when the sensor 11 is attached again. Accordingly, the mounting-position-specific calibration data set may also be assigned to the sensor holder 15 at the corresponding mounting position 16. In order to depict this assignment, it may be provided that the sensor holder 15 has an identification feature 17 (or some other manner in which to identify the sensor holder 15).

The identification feature 17 may be transmitted from the sensor holder 15 to the control assembly 12. However, in some embodiments, this sensor holder 15 does not have its own electronics. In particular, it may therefore also be provided that the sensor 11, in particular in the mounted state, reads out the identification feature 17 and transmits it to the control assembly 12. In one or some embodiments, the sensor holder 15 has a near field communication (NFC) tag. The sensor 11 may then have an NFC reader, through which the sensor 11 reads out the identification feature 17 of the sensor holder 15 and transmits it to the control assembly 12. Alternatively, it may also be provided that the user 18 may enter the identification feature 17 via an input device, such as a smartphone or a terminal 19, or read it out with the smartphone. The input device may then communicate with the control assembly 12, or may be part of the control assembly 12. Alternatively, or in addition, the identification feature 17 may therefore be a QR code that the user 18 reads out, for example in a dedicated app. All these options allow for the sensor 11 to be quickly mounted, which leads directly to the usability of the sensor 11 for determining the working height 13. Instead of a smartphone, a tablet, a laptop, a smartwatch or the like may also be used.

Additionally or alternatively, a user 18 may select the mounting-position-specific calibration data set from an input unit, such as an input unit of an agricultural production machine 1 that communicates with the control assembly 12, or the control assembly 12 automatically selects the mounting-position-specific calibration data set based on the identification feature 17.

In one or some embodiments, the control assembly 12 performs a calibration routine in which the control assembly 12 generates a mounting-position-specific calibration data set and saves it in the memory. This calibration routine is explained in greater detail below. In one or some embodiments, in the calibration routine, the control assembly 12 saves a reference height and/or an orientation of the sensor 11 in the mounted state at the particular mounting position 16, and/or a location of the mounting position 16 relative to the agricultural attachment 3 in the mounting-position-specific calibration data set.

In one or some embodiments, the calibration routine is performed on level ground. In so doing, the control assembly 12 may inform the user 18 that she/he should park the agricultural production machine 1 and/or the agricultural attachment 3 on level ground, and/or assume that this has been done. Moreover, in one or some embodiments, the agricultural attachment 3 assumes a reference height. In the case of a plow 9, the reference height may, for example, be established at a working height 13 of zero when the plowshares 14 are placed on the ground. However, in a seeder, for example, it may also happen that the lowest adjustable height and a usual working height 13 are too far apart to calibrate the sensor 11 in this manner and still remain within the specification of the sensor 11 during use. Therefore, it may equally be provided that the user 18 is requested to enter or otherwise determine the reference height.

In one or some embodiments, the control assembly 12 uses the sensor 11 in the calibration routine to measure a distance of the sensor 11 from the ground and stores this as the reference height. It is noted that the mounting position 16, which may be specified by the control assembly 12, does not have to be precisely maintained by the user 18, especially in the height direction, since it is removed from the reference height when the working height 13 is determined. In other directions as well, great precision is usually not required due to the tolerances prevailing in agriculture.

If the agricultural attachment 3 has its own setting options for the working height 13, it may be provided that the settings present during the calibration routine are also saved in the mounting-position-specific calibration data record, and changes to these settings may lead to the user 18 being warned, or if necessary, be taken into account using a model of the agricultural attachment 3 when determining the working height 13.

In one or some embodiments, it is further provided that the control assembly 12 guides a user 18 through the calibration routine using an output unit in a natural language dialog. In one or some embodiments, the control assembly 12 specifies a mounting position 16 to the user 18, or the user 18 transmits the mounting position 16 to the control assembly 12, such as by voice input, and/or the control assembly 12 tells the user 18 a setting of a working height 13 of the agricultural attachment 3, or the user 18 transmits the setting of a working height 13, such as by voice input, to the control assembly 12, and/or the control assembly 12 tells the user 18 to park the agricultural production machine 1 and/or the agricultural attachment 3 on level ground.

The dialog may be performed using a voice output device and/or voice input device of the agricultural production machine 1 and/or a smartphone. However, it is equally possible to use a terminal 19 of the agricultural production machine 1 and/or the smartphone without voice input and/or output.

In one or some embodiments, the agricultural production machine 1 and/or the agricultural attachment 3 is on level ground during the calibration routine, the user 18 mounts the sensor holder 15 at a mounting position 16 on an agricultural attachment 3 and connects the sensor 11 to the sensor holder 15, and the control assembly 12 performs a calibration routine in which the control assembly 12 determines a reference height and generates a mounting-position-specific calibration data set and preferably saves it in the memory.

The output unit may be the terminal 19 or the smartphone, and/or may have the voice output device.

In one or some embodiments, the sensor 11 is mountable on the sensor holder 15 in a form fit and/or force fit. In particular, the sensor 11 may be mountable on the sensor holder 15 using a quick-locking device, and/or using one or more screws, and/or magnetically, and/or is clipable in the sensor holder 15. In one or some embodiments, the sensor 11 may be mounted on the sensor holder 15 using commercially available tools or without any tools at all.

In one or some embodiments, the sensor holder 15 has a battery and/or an electrical connection unit, in particular a cable or an antenna, for connection to the control assembly 12, and/or for transmitting energy from an agricultural production machine 1 to the sensor 11. In one or some embodiments, the electrical connection unit has a bus connection, such as an ISOBUS or CAN bus connection.

Using a sensor holder 15 designed in this way, the sensor 11 may be supplied with power. At the same time or alternatively, the sensor holder 15 may be used to transmit the data from the sensor 11 to the control assembly 12. This is particularly interesting if the control assembly 12 is part of the agricultural production machine 1, or the connection to the control assembly 12 runs via the agricultural production machine 1. If the sensor holder 15 has a cable that may be connected to a bus of the agricultural production machine 1 if necessary, and if the sensor holder 15 remains on the agricultural attachment 3, the wiring only has to be done once. This is a logical extension of the "plug and play" concept of the sensor assembly 10. The battery may of course alternatively be an accumulator. In the same way, the sensor 11 may also have its own battery or accumulator. In particular, it is also contemplated for the sensor holder 15 to have no electronics at all, in which case the NFC tag is not considered as electronics. Provided that the agricultural attachment 3 has its own power supply, which may be powered by the agricultural production machine 1, the sensor 11 may also be connected thereto, in particular via the sensor holder 15.

In one or some embodiments, the control assembly 12 additionally determines the working height 13 from an attachment-specific calibration data set, and the attachment-specific calibration data set comprises kinematics of the particular agricultural attachment 3, and/or the control assembly 12 additionally determines the working height 13 from a coupling data set, and the coupling data set comprises machine parameters of an equipment interface 2 between the agricultural production machine 1 and the particular agricultural attachment 3 (e.g., the coupling data set comprises machine parameters of a three-point power lifter 4).

Using the attachment-specific calibration data set and coupling data set, the number of necessary sensors 11 to determine several working heights 13 may be reduced, for example, via an axis transformation using the kinematics of the agricultural attachment 3 or via known machine parameters of the equipment interface 2. The determination of a single working height 13 may also be verified or performed more precisely in this way, if necessary. In one or some embodiments, however, at least one working height 13 may be determined without taking into account the machine parameters of the equipment interface 2.

In principle, the attachment-specific calibration data set may be contained in the mounting-position-specific calibration data set, or vice versa. The coupling data set may be attachment-specific, but does not have to be. It may comprise, for example, lengths of hydraulic cylinders of the equipment interface 2. Generally speaking, machine parameters are to be understood as any or all of the settings, associated sensor measured values, and the like. In one or some embodiments, the machine parameters relate at least partially to machine parameters that have a direct influence on the working height 13 that is to be detected.

Moreover, in one or some embodiments, the sensor 11 is any one, any combination, or all of: a distance sensor; an optical sensor; a radar sensor; a lidar sensor; an ultrasound sensor; or an NIR sensor. In one or some embodiments, the sensor 11 measures the measured data relating to work quality parameters while the fieldwork is being performed and/or after the fieldwork has been performed. In one or some embodiments, the sensor 11 and/or another sensor 20 measures measured data relating to a field parameter in the forefield. In one or some embodiments, the control assembly 12 determines the work quality parameter from the measured data of the sensor 11 and the other sensor 20. A forefield sensor 21 may be provided to measure the forefield data.

To the extent that there are several sensors 11, the statements concerning one sensor 11 may apply to the other sensors 11. Likewise, however, different embodiments of the described sensor 11 may be combined.

In the forefield, such as terrain features, remaining biomass in the field, moisture, type of vegetation or a feature of the vegetation, type of soil, compaction or the like are measured. After the agricultural production machine 1, such as after the fieldwork, compacting, ground evenness, mixing, and the like may be measured. Working depth may be measured, such as during fieldwork.

In one or some embodiments, the sensor 11 comprises a lidar sensor, with the work quality parameter being any one, any combination, or all of: crumbling and/or leveling of seed bed preparation; forefield furrow width; a plowing pattern when plowing; leveling by grubbers; or the result of fieldwork by leveling bars and/or an edge plate of a rotary harrow.

In one or some embodiments, the sensor 11 is a 3D camera, with the work quality parameter is mixing by grubbers, and/or a side pull of a plow 9 or the disc harrow, and/or accuracy of a parallel run, in particular when driving on slopes.

A camera, such as the 3D camera, may be combined with any existing cameras in the front and/or on the sides of the agricultural production machine 1, for example to perform 360° measurement.

In one or some embodiments, the control assembly 12, while performing a job, controls or regulates at least one machine parameter of the agricultural production machine 1 and/or the particular agricultural attachment 3 based on the measured data and generates the common data set therefrom and from additional measured data. In one or some embodiments, the control assembly 12 does not use the measured data for controlling or regulating the agricultural production machine 1 and/or the particular agricultural attachment 3 while performing another job, and generates the common data set therefrom and from further measured data. In one or some embodiments, the sensor 11 records measured data while performing another job in which no agricultural attachment 3 is used, and the control assembly 12 generates the common data set therefrom and from other measured data.

In this regard, the possibility of recording measured data from completely different jobs is disclosed, such as even if the recordings are not at all required for the job. It is also contemplated to affix the described modular sensors 11 in the interim on the agricultural production machine 1.

Moreover, in one or some embodiments, the at least one work quality parameter relates to a working depth, and/or the at least one work quality parameter relates to soil humidity, and/or re-hardening, and/or a mixing of the soil, and/or plant residue, and/or a soil composition.

In addition or alternatively, the control assembly 12 plans the execution of a job based on the common data set, such as the planned job comprises any one, any combination, or all of: soil cultivation (e.g., plowing); a fertilizing process; a spraying process; a watering process; or a crop management process.

As previously mentioned, the common data set offers completely new possibilities in planning jobs due to the higher availability of data. In addition, the implementation of the planning may be evaluated directly on site and included in the regulation of the agricultural combination. The cultivation strategy may be short term and/or long term. In addition to regulation, the collected data may also be used as target variables for more general equipment depth guidance, and/or contact pressure regulation and/or travel speed as a setting and the like.

In one or some embodiments, the distance sensor is used to monitor crop heights, such as growth behavior. This use may be provided at a time at which the distance sensor is not used to determine the work height 13.

In one or some embodiments, the control assembly 12 controls or regulates at least one machine parameter of the agricultural production machine 1 and/or the agricultural attachment 3, such as a working height 13 of the agricultural attachment 3, based on the planned job, and the measured data relating to the work quality parameter.

In one or some embodiments, the control assembly 12 links the measured data to a position in the standardization routine, and/or that the control assembly 12 is arranged, at least partially (e.g., completely), in the agricultural production machine 1. Further, in one or some embodiments, the control assembly 12 links position data of a position sensor, such as a GPS sensor, of the agricultural production machine 1 to the measured data in the standardization routine.

In addition, in one or some embodiments, a sensor assembly 10 configured for use in the disclosed method is proposed.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural production machine
2 Device interface
3 Agricultural attachment
4 Three-point power lifter
5 Lower link
6 Upper link
7 Baler
8 Artificial fertilizer spreader
9 Plow
10 Sensor assembly
11 Sensor
12 Control assembly
13 Working height
14 Plowshare
15 Sensor holder
16 Mounting position
17 Identification feature
18 User
19 Terminal
20 Additional sensor
21 Forefield sensor
22 Processor
23 Memory

The invention claimed is:

1. A method for collecting agricultural measured data in an agricultural production machine that is combined with or connected to at least one agricultural attachment for performing fieldwork, wherein a sensor assembly includes a sensor and a control assembly, wherein the sensor becomes integrated in agricultural combinations of the agricultural production machine and a plurality of different agricultural attachments, the method comprising:

recording, by the sensor, measured data relating to at least one work quality parameter of a particular attachment;

transmitting, by the sensor, the measured data to the control assembly;

generating, by the control assembly using a standardization routine, a common data set from the measured data relating to the plurality of different agricultural attachments; and controlling, by the control assembly, one or both of the agricultural production machine or the at least one agricultural attachment based on at least one of the measured data or the common data set.

2. The method of claim 1, wherein the control assembly does one or both of:

determining the at least one work quality parameter of the particular attachment from the measured data using an attachment-specific calibration data set; or converting the measured data by an attachment-specific standardization data set into attachment-independent measured data and combines the attachment-independent measured data into the common data set.

3. The method of claim 2, wherein the control assembly generates the common data set from the attachment-independent measured data that comprises the at least one work quality parameter for different processed jobs of the agricultural production machine with the plurality of different agricultural attachments.

4. The method of claim 1, wherein the agricultural production machine comprises a tractor;

wherein the sensor is one or both of:

connected to a bus of the agricultural production machine; or permanently installed in the agricultural production machine;

wherein the sensor is integrated in a machine communication bus of the agricultural production machine; and wherein the sensor is installed under the tractor.

5. The method of claim 1, wherein the sensor is a working height sensor;

wherein the at least one work quality parameter is an absolute working height; and wherein the control assembly regulates the absolute working height based on the measured data.

6. The method of claim 1, wherein the sensor is reversibly mounted using at least one sensor holder at a mounting position on the plurality of different agricultural attachments;

wherein the sensor holder is mounted separately from the sensor on the plurality of different agricultural attachments;

wherein the sensor is reversibly mounted on the sensor holder;

wherein, in a mounted state, the sensor records measured data relating to a working height of a respective agricultural attachment and transmits the measured data relating to the working height to the control assembly; and wherein the control assembly determines the working height of the respective agricultural attachment from a mounting-position-specific calibration data set.

7. The method of claim 1, wherein the sensor comprises one or more of: a distance sensor; an optical sensor; a radar sensor; a lidar sensor; an ultrasound sensor; or an Near-infrared (NIR) sensor;

wherein the sensor measures the measured data relating to at least one work quality parameter while or after the fieldwork is being performed;

wherein another sensor measures the measured data relating to work quality parameters while or after the fieldwork is being performed; and wherein the control assembly determines the at least one work quality parameter from the measured data of the sensor and the another sensor.

8. The method of claim 1, wherein the sensor comprises a lidar sensor; and wherein the at least one work quality parameter comprises one or more of: crumbling; leveling of seed bed preparation; forefield furrow width; plowing pattern when plowing; leveling by grubbers; or a result of fieldwork by one or both of leveling bars or an edge plate of a rotary harrow.

9. The method of claim 1, wherein the sensor is a 3D camera; and wherein the at least one work quality parameter comprises one or more of: mixing by grubbers; a side pull of a plow or a disc harrow; accuracy of a parallel run when driving on slopes.

10. The method of claim 1, wherein the control assembly, while performing a job, controls or regulates at least one machine parameter of one or both of the agricultural production machine or the particular attachment based on the measured data and generates the common data set therefrom and from additional measured data from another job.

11. The method of claim 10, wherein the another job for which the additional measured data is recorded is in which no attachment is used.

12. The method of claim 1, wherein the at least one work quality parameter relates to one or more of: a working depth; soil humidity; re-hardening; a mixing of soil; plant residue; or soil composition.

13. The method of claim 1, wherein the control assembly plans execution of a job based on the common data set; and wherein the job comprises one or more of: plowing; a fertilizing process; a spraying process; a watering process; or a crop management process.

14. The method of claim 13, wherein the control assembly controls or regulates a working height of a respective agricultural attachment based on a planned job; and wherein the measured data relates to the at least one work quality parameter.

15. The method of claim 1, wherein one or both of: performs one or both of:

the control assembly links the measured data to a position in the standardization routine; or the control assembly is positioned completely in the agricultural production machine; and wherein the control assembly links position data of a GPS sensor of the agricultural production machine to the measured data in the standardization routine.

16. A sensor assembly comprising:

a sensor; and a control assembly;

wherein the sensor is configured for integration in agricultural combinations of an agricultural production machine and a plurality of different agricultural attachments;

wherein the agricultural production machine is configured to combine with or connect to at least one agricultural attachment of the plurality of different agricultural attachments for performing fieldwork;

wherein the sensor is configured to:

record measured data relating to at least one work quality parameter of a particular attachment; and transmit, by the sensor, the measured data to the control assembly; and wherein the control assembly is configured to:
    using a standardization routine, generate a common data set from the measured data relating to the plurality of different agricultural attachments; and
    control one or both of the agricultural production machine or the at least one agricultural attachment based on at least one of the measured data or the common data set.

17. The sensor assembly of claim 16, wherein the control assembly is configured to perform one or both of:
    determining the at least one work quality parameter of the particular attachment from the measured data using an attachment-specific calibration data set; or
    converting the measured data by an attachment-specific standardization data set into attachment-independent measured data and combines the attachment-independent measured data into the common data set.

18. The sensor assembly of claim 17, wherein the control assembly is configured to generate the common data set from the attachment-independent measured data that comprises the at least one work quality parameter for different processed jobs of the agricultural production machine with the plurality of different agricultural attachments.

19. The sensor assembly of claim 17, further another sensor configured to measure the measured data relating to work quality parameters while or after fieldwork is being performed; and
    wherein the control assembly is configured to determine the at least one work quality parameter from the measured data of the sensor and the another sensor.

* * * * *